(12) United States Patent
Kizu

(10) Patent No.: US 6,895,174 B2
(45) Date of Patent: May 17, 2005

(54) FRAME NUMBER DETECTING DEVICE

(75) Inventor: Naoki Kizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 934 days.

(21) Appl. No.: 09/840,052

(22) Filed: Apr. 24, 2001

(65) Prior Publication Data

US 2003/0206243 A1 Nov. 6, 2003

(30) Foreign Application Priority Data

Jun. 22, 2000 (JP) ...................................... P2000-187455

(51) Int. Cl.[7] ............................ H04N 5/85; H04N 5/91
(52) U.S. Cl. ........................................ 386/125; 386/46
(58) Field of Search ................................ 386/125, 126, 386/124, 105, 106, 12, 13, 21, 40, 45, 46, 57, 59, 61, 84, 113; H04N 5/85, 5/91

(56) References Cited

U.S. PATENT DOCUMENTS 5,982,294 A * 11/1999 Takayama et al. ......... 340/7.44

2003/0090505 A1 * 5/2003 McGee et al. ............... 345/721

FOREIGN PATENT DOCUMENTS

JP 1055627 2/1998
JP 11176081 7/1999

* cited by examiner

Primary Examiner—Robert Chevalier
(74) Attorney, Agent, or Firm—Birch, Stewart, Kolasch & Birch, LLP

(57) ABSTRACT

An object is to provide a frame number detecting device having a frame counter which is less apt to output a wrong frame number even if a sync signal type was erroneously detected from a DVD etc. and the combination of variation of the sync signal types corresponds to an existing frame number. A sync number encoding portion (6) specifies a read frame number and provides it as an output. First and second frame counters (7) and (13) run by themselves and output their count numbers. A state detecting counter (9) causes a state variable to go up/down according to whether a signal (S5) and a signal (S7) agree with each other. When the state variable is at its lowest value and the sync number encoding portion (6) was able to specify the frame number, the signal (S5) is reflected in the signal (S7). When the state variable has reached its highest value, the signal (S7) is reflected in a signal (S13).

10 Claims, 11 Drawing Sheets

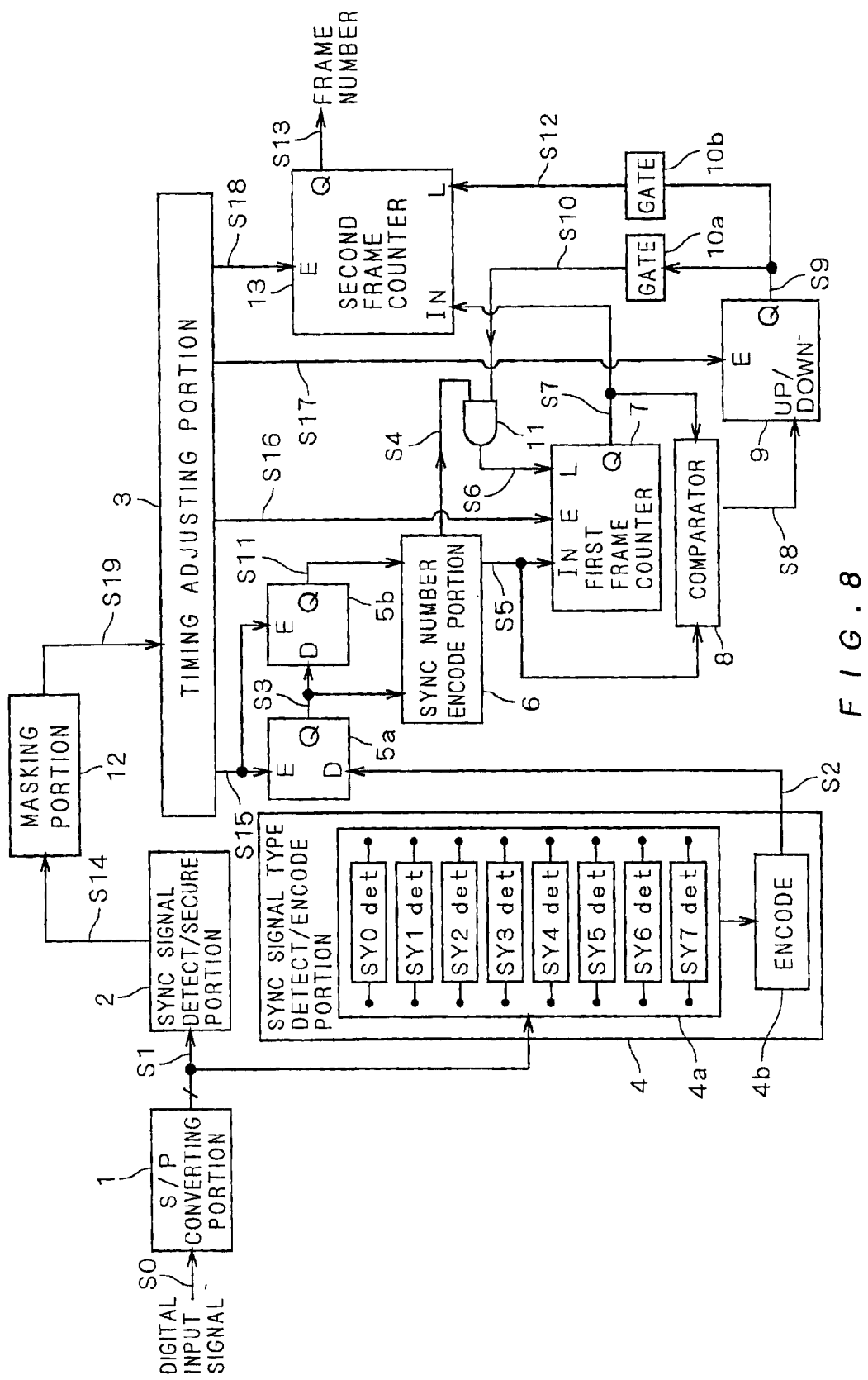
F I G . 8

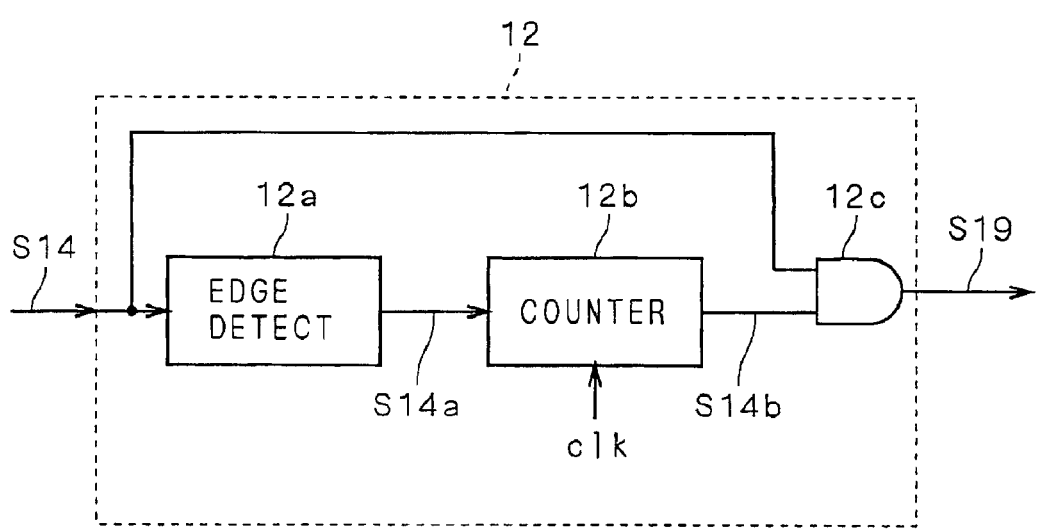
F I G. 9

F I G . 1 3
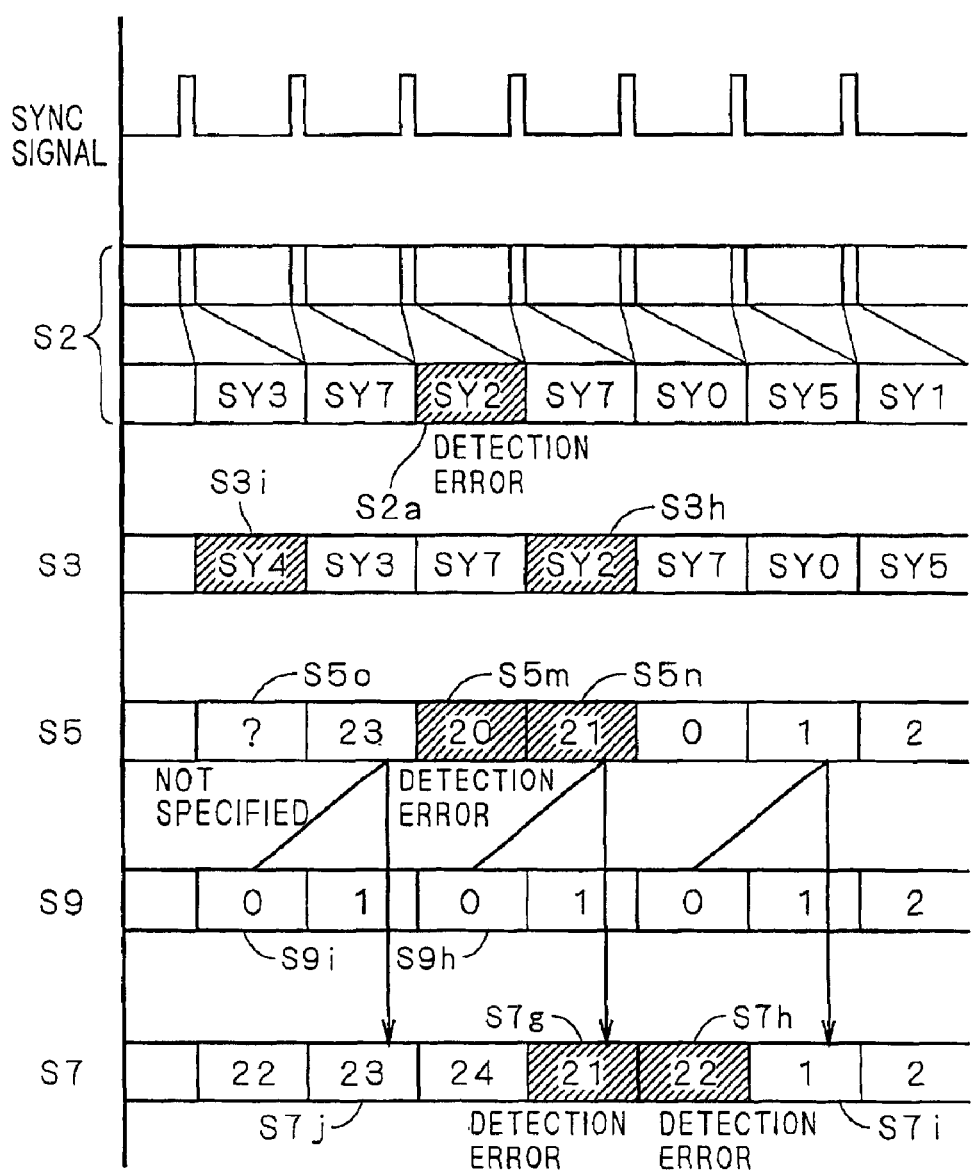

FRAME NUMBER DETECTING DEVICE

BACKGROUND OF THE INVENTION

1. Field of the Invention

The present invention relates to a frame number detecting device used in digital data playback devices, specifically an optical disk playback device etc. to detect frame numbers in the playback data.

2. Description of the Background Art

When a digital data playback device such as an optical disk playback device plays back data, it first reads a playback signal from a recording medium such as an optical disk by using a detecting portion such as an optical pickup. The read playback signal is amplified in an amplifier, waveform-corrected in a waveform equalizer and converted into a digital signal. Then a synchronization detecting circuit detects a frame sync signal contained in the playback signal to establish synchronization with the playback data.

In DVDs (Digital Versatile Discs) which are now attracting attention as new information media, data such as image data etc. is recorded in frames as shown in FIG. 11 and a group of frames form a sector. One sector contains 26 frames, each frame containing a 32-bit frame sync signal (eight kinds SY0 to SY7) and 1456-bit data Each of the frame sync signals SY0 to SY7 is a signal composed of a 13-bit bit pattern and a 19-bit bit pattern coupled together, the 13-bit bit patterns are unique respectively to the eight kinds and the 19-bit bit pattern called 14T4T is common to SY0 to SY7. In practice, the frame sync signals SY0 to SY7 each have four kinds of variations, so that they have a total of 32 kinds of bit patterns.

As shown in FIG. 11, the frame sync signals SY0 to SY7 are respectively assigned to the 26 frames in one sector according to a predetermined arrangement. The frame sync signal located at the beginning of the sector is particularly called a sector sync signal. Herein, the bit pattern types of the frame sync signals SY0 to SY7 are referred to as sync signal types and the numbers showing positions of the frame sync signals counted from the beginning of the sector are referred to as sync numbers.

The sync number can be specified by observing the variation in the sync signal type (for example, when the sync signal type has changed from SY0 to SY5, it can be specified that it has changed from SY0 of the 0th frame to SY5 of the 1st frame). The frame sync signals SY0 to SY7 thus function as frame number information for specifying the frame numbers within the sector.

DVD requires detecting the frame sync signal and detecting and securing the sector sync signal. Particularly, in order to detect and secure the sector sync signal, it is extremely important to correctly detect where the playback frame is located in the sector and provide it as an output. However, it is actually difficult to correctly detect the frame number because of presence of defects on the disk (dirt, scratches, fingerprints, etc.) and resulting data bit slip etc. (the bit slip means detection error of the playback signal caused by a defect such as dirt, scratch, etc. on the disk, which leads to loss of synchronization between clock and data). For example, when actually playing back an optical disk such as a DVD, the quantity of light input to the optical pickup varies because of irregularities on the transparent resin package covering the disk, fingerprints on its surface, etc. The analog signal processing portion then may erroneously detect a 3T pattern (a data string of 1, 0, 0) as a 2T pattern (a data string of 1, 0) during digitization. Such a detection error of course occurs also when reading the sync signal type. Therefore various frame number detecting devices have been suggested to correctly detect the frame number.

FIG. 12 is a block diagram showing part of the device shown in FIG. 7 in Japanese Patent Application Laid-Open No. 10-55627 (1998) as an example of such a frame number detecting device. In this diagram, the reference character 1 denotes an S/P (serial→parallel) converting portion for converting serial data into parallel data, 4 denotes a sync signal type detecting/encoding portion for detecting the sync signal type of the frame sync signal in the parallel data and encoding the sync signal type, 5*a* denotes a latch circuit for latching the sync signal type detected and encoded, 6 denotes a sync number encoding portion for encoding the sync number (i.e. frame No.) on the basis of the variation between successive sync signal types, 7 denotes a frame counter which counts up in accordance with sync signal input and outputs its count number as an expected frame number and which changes its count number to the output value provided from the sync number encoding portion 6 under a given condition, 8 denotes a comparator portion for comparing the sync number outputted from the sync number encoding portion 6 and the count number from the frame counter 7, 9 denotes a state detecting counter which counts up/down a state variable as an indicator of the correctness of the frame number detection in accordance with the result provided from the comparator portion 8, 10*a* denotes a gate circuit composed of a combination of AND and OR gates etc., for detecting that the state variable of the state detecting counter 9 has reached its lowest value, and 11 denotes a gate circuit for setting the condition under which the frame counter 7 changes its count number to the output value provided from the sync number encoding portion 6.

Next, operation of this frame number detecting device is described. First, the S/P converting portion 1 converts the digital input signal S0 as serial data into a plurality of pieces of parallel data S1 containing the same contents.

The sync signal type detecting/encoding portion 4 comprises a sync signal type detecting portion 4*a* and a sync signal type encoding portion 4*b*; in the sync signal type detecting portion 4*a*, the pieces of parallel data S1 are respectively supplied to detectors for detecting SY0 to SY7 to specify the sync signal type among SY0 to SY7. The detected sync signal type is encoded in the sync signal type encoding portion 4*b*. The encoded sync signal type information is outputted as a signal S2, which is held for one frame period in the latch circuit 5*a*.

The sync number encoding portion 6 encodes the current frame number and outputs it as a signal S5 on the basis of the combination of the sync signal type information signal S2 and the signal S3 outputted from the latch circuit 5*a*. For example, when the signal has changed as SY3→SY7 (when the output signal S3 from the latch circuit 5*a* is SY3 and the sync signal type information signal S2 is SY7), it determines that the current frame number is the twenty-third frame as shown in FIG. 11. It then performs encoding to represent this frame number and outputs it as the signal S5.

When the sync signal type detecting/encoding portion 4 was unable to correctly detect the sync signal type and the combination of the signal S2 representing the encoded sync signal type information and the output signal S3 from the latch circuit 5*a* does not correspond to any existing frame number (for example, when the sync signal type has changed from SY4 to SY3, i.e. when the output signal S3 of the latch circuit 5*a* is SY4 and the sync signal type signal S2 is SY3), the sync number encoding portion 6 determines that the frame number cannot be specified and causes its output signal S4 to go Low.

The frame counter 7 increments its count number in response to an enable signal (input to the terminal E) which corresponds to the sync signal input and outputs this value as a signal S7 from the terminal Q (when its count number has reached 25, it returns to 0). However, when a given condition was satisfied and the signal S6 inputted to the terminal L has become High, it loads the signal S5 from the terminal IN and changes the count value to the output value provided from the sync number encoding portion 6.

The comparator portion 8 compares the output signal S5 from the sync number encoding portion 6 and the output signal S7 from the frame counter 7 to see whether they agree with each other. The result of comparison is outputted as a signal S8 to the state detecting counter 9 which is constructed as a 2-bit up/down counter (the "2-bit" means that it can take values 0, 1, 2 and 3: these values are referred to as "state variable" in this application). When the two match, the signal S8 causes the value of the state variable to go up, for example, and it is outputted as a signal S9 from the state detecting counter 9. On the other hand, when they mismatch, it causes the value of the state variable of the state detecting counter 9 to go down.

When the signal S9 outputted from the state detecting counter 9 is at its lowest level (when the signal S5 and the signal S7 have continuously disagreed, e.g. when the state variable value is 0), the gate circuit 10a causes the signal S10 to go High. This signal S10 is inputted together with the signal S4 to the gate circuit 11 constructed as an AND gate. When both of the signals S10 and S4 are High, the signal S6, i.e. the output of the gate circuit 11, goes High. This is the condition under which the frame counter 7 loads the signal S5 or the output from the sync number encoding portion 6.

This prevents the frame counter 7 from running by itself with its count number disagreeing with the output signal S5 from the sync number encoding portion 6. That is to say, the comparator portion 8 compares the output signal S5 provided from the sync number encoding portion 6 and the signal S7 as an expected frame number provided from the frame counter 7 and checks whether the two agree. When the frame counter 7 is running by itself with its count number disagreeing with the output signal S5 of the sync number encoding portion 6, the state detecting counter 9 detects it on the basis of the output from the comparator portion 8 and then it causes, through the gate circuit 10a and 11, the frame counter 7 to reflect the contents of the signal S5 outputted from the sync number encoding portion 6, so as to make a correction.

The use of the frame counter 7 makes it possible to output a correct frame number as its output signal S7 even when the sync signal type is not correctly detected because of defects on the disk (dirt, scratches, fingerprints, etc.)

FIG. 13 is a timing chart showing the operation of the frame number detecting device shown in FIG. 12. This timing chart shows an example in which the sync signal type was erroneously detected as SY4 in the frame S3i where it should be SY7 and the sync signal type was correctly detected as SY3 in the next frame. When it thus changes from SY4 to SY3 (when the signal S3 is SY4 and the signal S2 is SY3), the sync number encoding portion 6 cannot specify the frame number since this variation does not correspond to any existing frame number, so that it cannot output the signal S5 as shown in the frame S5o. It changes the output signal S4 from High to Low.

In this case, since the input signal S6 to the terminal L is not High, the frame counter 7 increments its count number from 21 to 22 in response to the enable signal corresponding to the sync signal input and outputs this value as the signal S7 (it is assumed that the count number was 21 in the preceding frame). Further, since the signals S5 and S7 disagree, the comparator portion 8 outputs the signal S8 to cause the state variable of the state detecting counter 9 to go down from 1 to 0 (it is assumed that the value of the state variable was 1 in the preceding frame). FIG. 13 shows this value of the signal S9 or the state variable in the frame S9i.

Now, when the next frame data is inputted and its sync signal type is correctly detected as SY7 (when the signal S3 is SY3 and the signal S2 is SY7), the sync number encoding portion 6 outputs the frame number 23 corresponding to this variation as the signal S5. It also changes the output signal S4 from Low to High since it was able to specify the frame number.

Since the state variable in the state detecting counter 9 was 0 in the preceding frame and the sync number encoding portion 6 was able to specify the frame number, the output signal S6 from the gate circuit 11 goes High. The frame counter 7 therefore loads the signal S5 from the terminal IN and changes the value of its count number to the output value of the sync number encoding portion 6. That is to say, as shown in the frame S7j in FIG. 13, the count number of the frame counter 7 takes the value 23.

At this time, since the signal S5 and the signal S7 agree with each other, the comparator portion 8 provides the signal S8 to cause the state variable of the state detecting counter 9 to go up from 0 to 1.

In this way, the conventional frame number detecting device reads the frame number by using the frame counter 7 which runs by itself in response to an enable signal. Therefore, even if the sync signal type was unable to be correctly detected as shown in the frame S3i in FIG. 13 because of a defect on the disk (dirt, scratch, fingerprint, etc.), a correct frame number can be provided as the output signal S7 of the frame counter 7. The frame number can thus be more correctly outputted than in a device which specifies the frame number by directly using the sync signal type detected in the sync signal type detecting/encoding portion 4.

In FIG. 13, the signal S2 should be detected as SY4 in the frame S2a immediately following the frame in which SY7 was detected, since the frame number should be 24. However, SY2 is detected because of a detection error. As a result, despite the fact that it is actually the twenty-fourth frame, the sync number encoding portion 6 outputs the frame number as 20 as shown in the frame S5m in accordance with the combination of SY7→SY2 (the signal S3 is SY7 and the signal S2 is SY2). In this case, it keeps the output signal S4 High since it was able to specify the frame number.

Then, since the state variable of the state detecting counter 9 was 1 in the preceding frame, the output signal S6 from the gate circuit 11 goes Low and the frame counter 7 therefore increments the count number without loading the signal S5. That is to say, the count number of the frame counter 7 takes the value 24.

Since the signal S5 and the signal S7 disagree at this time, the comparator portion 8 provides the signal S8 to cause the state variable of the state detecting counter 9 to go down from 1 to 0 as shown in the frame S9h.

Now, when the next frame data is inputted and its sync signal type is correctly detected as SY7 (when the signal S3 is SY2 and the signal S2 is SY7), the sync number encoding portion 6 detects the frame number on the basis of the erroneously detected SY2 in the frame S3h and outputs the frame number 21 corresponding to this variation as the signal S5 as shown in the frame S5n, in spite of the fact that the frame number should be 25. It keeps the output signal S4 High since it was able to specify the frame number.

At this time, since the state variable of the state detecting counter 9 was 0 in the preceding frame and the sync number encoding portion 6 was able to specify the frame number, the output signal S6 of the gate circuit 11 goes High. The frame counter 7 therefore loads the signal S5 from the terminal IN and changes the value of its count number to the output value provided from the sync number encoding portion 6. That is to say, the count number of the frame counter 7 takes the value 21 as shown in the frame S7g of FIG. 13. Needless to say, this value is wrong: it should actually be 25.

Also, since the signal S5 and the signal S7 agree at this time, the comparator portion 8 outputs the signal S8 to cause the state variable of the state detecting counter 9 to go up from 0 to 1.

Subsequently the next data frame is inputted, and if its sync signal type is correctly detected as SY0 (when the signal S3 is SY7 and the signal S2 is SY0), they operate as described above and the frame counter 7 increments the value of its count number from 21 to 22 as shown in the frame S7h and outputs it as the signal S7. This value is of course wrong: it should actually be 0.

Then the next frame data is inputted and if its sync signal type is correctly detected as SY5 (when the signal S3 is SY0 and the signal S2 is SY5), they operate as described above and the frame counter 7 loads the signal S5 as shown in the frame S7i and changes the value of its count number to the output value 1 provided from the sync number encoding portion 6.

In this way, in the conventional frame number detecting device, the frame counter 7 provides a wrong output when the sync signal type detecting/encoding portion 4 detects a wrong sync signal type because of a defect on the disk (dirt, scratch, fingerprint, etc.) and resulting bit slip etc. and if the sync signal type combination correspond to an existing frame number.

SUMMARY OF THE INVENTION

According to a first aspect of the invention, a frame number detecting device comprises: frame number detecting means receiving an input signal comprising a sector containing data of a plurality of frames, each frame comprising frame number information recorded as a sync signal used to specify the number of the frame in the sector, the frame number detecting means detecting the numbers of the frames by using the sync signal of the input signal; first and second counters which increment their count numbers in accordance with input of the sync signal, wherein when the count numbers have reached a given value, the first and second counters return the count numbers to zero and then increment the count numbers again in accordance with the input of the sync signal; comparing means for comparing the value of the number of the frame read by the frame number detecting means and the value of the count number of the first counter to see whether the values agree with each other; and state detecting means which causes a state variable to vary on the basis of the result of comparison made by the comparing means, wherein when the state variable satisfies a given condition, the state detecting means causes the first counter to change the value of the count number to the value of the number of the frame read by the frame number detecting means without incrementing the count number, and when the state variable satisfies another given condition, the state detecting means causes the second counter to change the value of the count number to the value of the count number of the first counter without incrementing the count number; and wherein the frame number detecting device outputs the value of the count number of the second counter as the number of the frame.

Preferably, according to a second aspect, in the frame number detecting device, the state variable can take at least three values, and when the result of comparison made by the comparing means indicates a mismatch, the state detecting means causes the value of the state variable to vary in an increasing or decreasing direction, and when the result of comparison made by the comparing means indicates a match, the state detecting means causes the value of the state variable to vary in a direction opposite to the direction adopted in the case of mismatch, and wherein the given condition is a condition in which the frame number detecting means was able to detect the number of the frame and the state variable has reached a given value, and the another given condition is a condition in which the state variable has reached another given value.

Preferably, according to a third aspect, the frame number detecting device further comprises timing adjusting means for adjusting timing of operations of the frame number detecting means, the first and second counters and the state detecting means by using the sync signal.

Preferably, according to a fourth aspect, the frame number detecting device further comprises: sync signal detecting/securing means for detecting the sync signal and outputting a pulse corresponding to the sync signal, wherein when the sync signal is lacking, the sync signal detecting/securing means inserts an interpolating sync signal pulse; and masking means for blocking the output of the pulse for a given period after the sync signal detecting/securing means has outputted one pulse.

Preferably, according to a fifth aspect, in the frame number detecting device, the sync signal comprises a plurality of types, and the frame number detecting means detects the numbers of the frames by using part of combinations of the types of the sync signal in successive two or more of the frames.

According to the first aspect, the value of the count number of the second counter is outputted as the frame number. Accordingly, as compared with a device which outputs the value of the count number of the first counter as the frame number, this device is less apt to output a wrong frame number even when the frame number detecting means has read a wrong frame number or when the frame number cannot be specified.

According to the second aspect, the value of the count number of the second counter is changed to the value of the count number of the first counter when the state variable has reached the aforementioned another given value. Thus, the second counter can be set to change the value of its count number when the value of the frame number read by the frame number detecting means and the value of the count number of the first counter have successively agreed with each other for a plurality of times. Therefore the second counter is less apt to output wrong frame numbers.

According to the third aspect, by using the sync signal, the timing adjusting means adjusts timing of operations of the frame number detecting means, first and second counters and state detecting means so that the first counter increments or change its count number after the frame number detecting means has detected the frame number. It can also adjust the timing so that the operation of the state detecting means precedes the operation of the second counter. Thus, the second counter can immediately change the value of its count number within a frame in which the state variable has satisfied the aforementioned another given condition, so that a correction can be immediately made even if the value of the count number of the second counter is disagreeing with the true frame number.

According to the fourth aspect, after the sync signal detecting/securing means has outputted one of the pulses, the masking means blocks the pulse output for a given period. Accordingly, even when a bit slip etc. has occurred in the sync signal, the frame number detecting means, first and second counters and state detecting means do not perform their operations a plurality of times within one frame data reading period. Therefore the second counter is less apt to output wrong frame numbers.

According to the fifth aspect, the frame number detecting means detects the frame numbers by using part of combinations of sync signal types of successive two or more frames. Therefore the frame number detecting means can be constructed on a reduced circuit scale, leading to higher operating speed.

Thus, an object of the present invention is to provide a frame number detecting device having a frame counter which is less apt to output a wrong frame number even if a sync signal type was erroneously detected from a DVD etc. and the combination of the varied sync signal types corresponds to an existing frame number.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing a frame number detecting device according to a second preferred embodiment.

FIG. 9 is a diagram showing the structure of masking portion 12 of the frame number detecting device of the second preferred embodiment.

FIG. 13 is a timing chart showing operation of the conventional frame number detecting device.

DESCRIPTION OF THE PREFERRED EMBODIMENTS

<First Preferred Embodiment>

Figure 1:
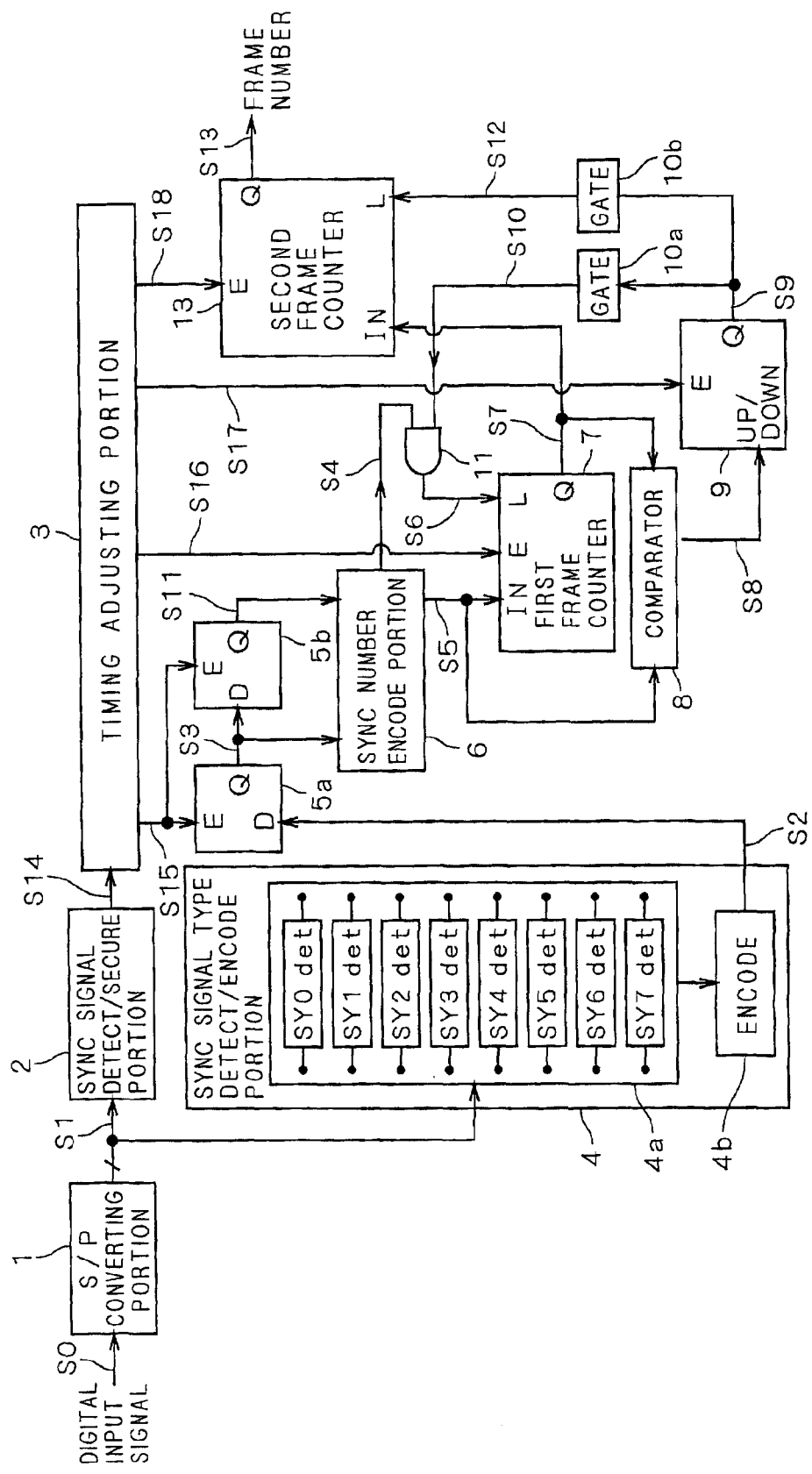
FIG. 1 is a block diagram showing a frame number detecting device according to a first preferred embodiment.
Figure 12:
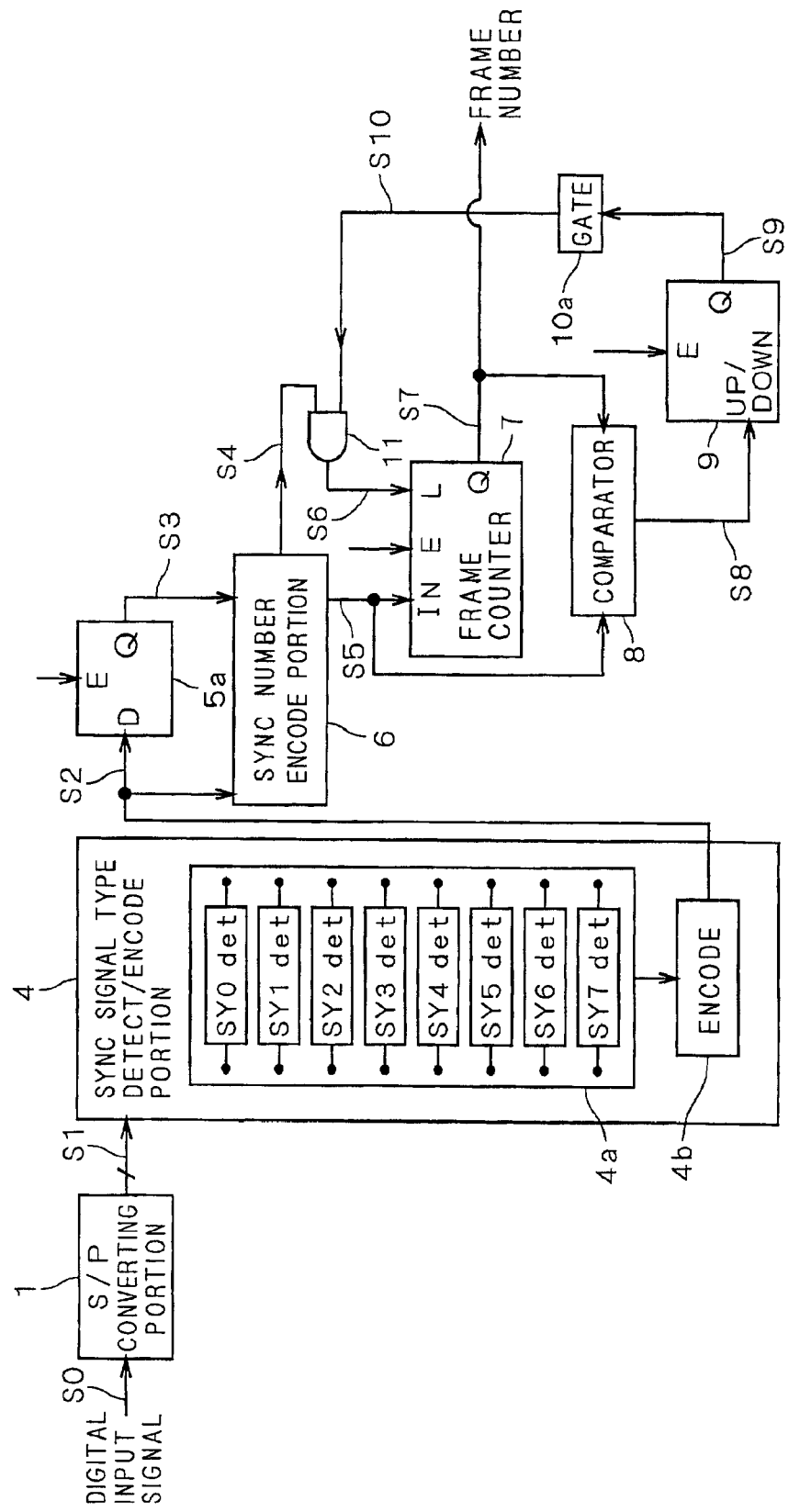
FIG. 12 is a block diagram showing a conventional frame number detecting device.

FIG. 1 is a diagram showing a frame number detecting device according to a first preferred embodiment of the present invention. In FIG. 1, components having the same functions as those in the conventional frame number detecting device shown in FIG. 12 are shown at the same reference characters. That is to say, like the conventional frame number detecting device of FIG. 12, the frame number detecting device of this preferred embodiment comprises an S/P (serial→parallel) converting portion 1 for converting serial data into parallel data, a sync signal type detecting/encoding portion 4 for detecting the sync signal type of the frame sync signal in the parallel data and encoding the sync signal type, a latch circuit 5a for latching the sync signal type detected and encoded, a sync number encoding portion 6 for encoding the sync number (i.e. frame No.) on the basis of the variation between successive sync signal types, a first frame counter 7 which counts up in accordance with sync signal input and outputs its count number as an expected frame number and which changes its count number to the output value provided from the sync number encoding portion 6 under a given condition, a comparator portion 8 for comparing the sync number outputted from the sync number encoding portion 6 and the count number provided from the first frame counter 7, a state detecting counter 9 which counts up/down a state variable as an indicator of the correctness of the frame number detection in accordance with the result provided from the comparator portion 8, a gate circuit 10a composed of a combination of AND and OR gates etc., for detecting that the state variable of the state detecting counter 9 has reached its lowest value, and a gate circuit 11 for setting the condition under which the first frame counter 7 changes its count number to the output value provided from the sync number encoding portion 6. Note that the frame counter 7 is named first frame counter so that it can be distinguished from a second frame counter described later. The signals are inputted/outputted among the components in the same way as those in the conventional frame number detecting device of FIG. 12 except that the signal S2 is not inputted to the sync number encoding portion 6.

The frame number detecting device of this preferred embodiment further comprises a sync signal detecting/securing portion 2 for detecting the sync signal and inserting an interpolating sync signal pulse when the sync signal is not detected because of lack etc., a timing adjusting portion 3 for providing enable signals to some components while adjusting timing, a latch circuit 5b for further latching the sync signal type which was once latched in the latch circuit 5a, a gate circuit 10b composed of a combination of AND and OR gates etc., for detecting that the value of the state variable of the state detecting counter 9 has reached a given value or higher, and a second frame counter 13 which counts up its count number in accordance with sync signal input and outputs the count number as an expected frame number and which changes its count number to the output value provided from the first frame counter 7 under a given condition.

Its operation is now described. First, the S/P converting portion 1 receives a digital input signal S0 as serial data and converts it into a parallel data signal S1.

Then the sync signal detecting/securing portion 2 receives the output signal S1 from the S/P converting portion 1 and detects whether the sync signal is inputted on a constant cycle by using a predicting window. In DVDs, the 14T4T pattern of the sync signal is a characteristic portion which can be easily distinguished from the data portion, so that the sync signal detecting/securing portion 2 detects this. It outputs a signal S14 while inserting an interpolating sync signal when the sync signal is not detected. The sync signal detecting/securing portion 2 can be constructed by using the technique shown in the first preferred embodiment of Japanese Patent Application Laid-Open No. 10-55627 (1998), for example.

The timing adjusting portion 3 receives the signal S14 outputted from the sync signal detecting/securing portion 2 and outputs enable signals S15, S16, S17 and S18 respectively to the latch circuits 5a, 5b, first frame counter 7, state detecting counter 9 and second frame counter 13. The enable signals are outputted in the order of S15, S16, S17 and S18, whose timing is adjusted so that the components operate in an appropriate order in a frame period (for example, the timing adjusting portion 3 causes a delay of 1-bit period or longer between the signals so that the order of operations of the latch circuits 5a, 5b, first frame counter 7, state detecting counter 9 and second frame counter 13 will not be disturbed).

While detecting the sync signal, the sync signal type detecting/encoding portion 4 detects the sync signal type from the signal S1, checks the type among SY0 to SY7 and encodes it. The encoded sync signal type is outputted as a signal S2 and latched in the latch circuit 5a for one frame period. The signal S3 outputted from the latch circuit 5a is held in the latch circuit 5b for one frame period. The timing adjusting portion 3 produces the latch timing by delaying the output signal S14 from the sync signal detecting/securing portion 2 for 1-bit period or more, for example, so that the latching operations will not precede the detecting/encoding operation of the sync signal type detecting/encoding portion 4.

The sync number encoding portion 6 encodes the frame number of the preceding frame on the basis of the combination of the output signal S3 from the latch circuit 5a and the output signal S11 from the latch circuit 5b and it outputs the frame number as a signal S5. When the sync signal type detecting/encoding portion 4 was not able to detect a correct sync signal type and the combination of the signals S3 and S11 does not correspond to any existing frame number, the sync number encoding portion 6 judges that the frame number cannot be specified and causes the output signal S4 to go Low.

Unlike the conventional frame number detecting device shown in FIG. 12, this device uses two latch circuits 5a and 5b and the sync number encoding portion 6 is supplied with their output signals S3 and S11 instead of the signal S2. While this change appears as a difference whether the sync number encoding portion 6 specifies the current frame number or the preceding frame number, the frame number detecting device of this preferred embodiment and the conventional frame number detecting device shown in FIG. 12 operate similarly in that they specify the frame number.

However, when two latch circuits 5a and 5b are used as in this preferred embodiment, the signal S2 may also be inputted to the sync number encoding portion 6 as well as the signals S3 and S11 so that it can encode the sync number by using sync signal types of successive three frames. Thus supplying more input signals to the sync number encoding portion 6 allows more correct frame number detection. On the other hand, however, when the continuity of the frame numbers is disturbed by jump operation or track slip, it will take longer time to recover correct frame number detection. Accordingly, the number of latch circuits and the number of input signals to the sync number encoding portion 6 can be designed considering the tradeoff between the advantage and disadvantage.

Figure 2:
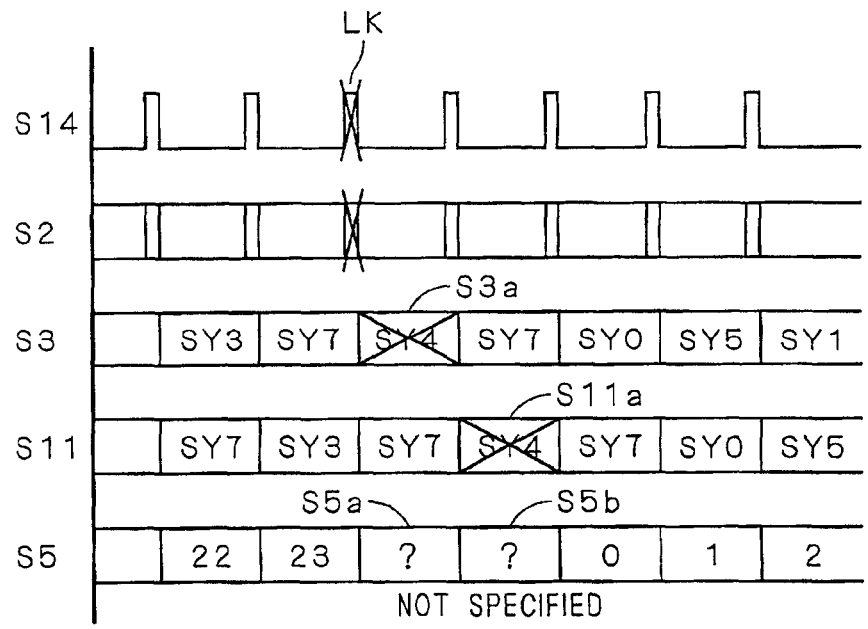
FIGS. 2, 3 and 4 are diagrams showing examples in which the frame number cannot be correctly outputted.
Figure 3:
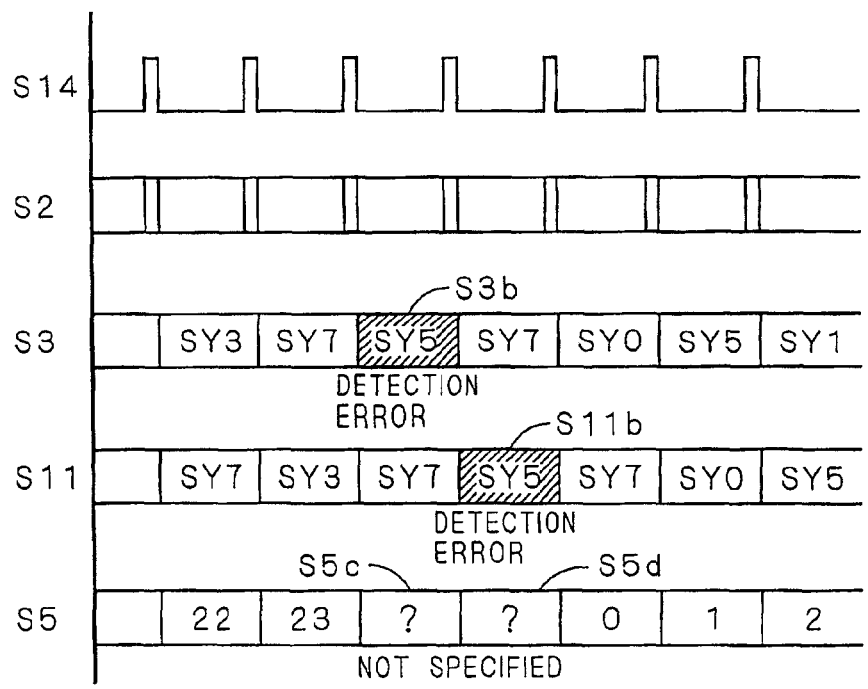
Figure 4:
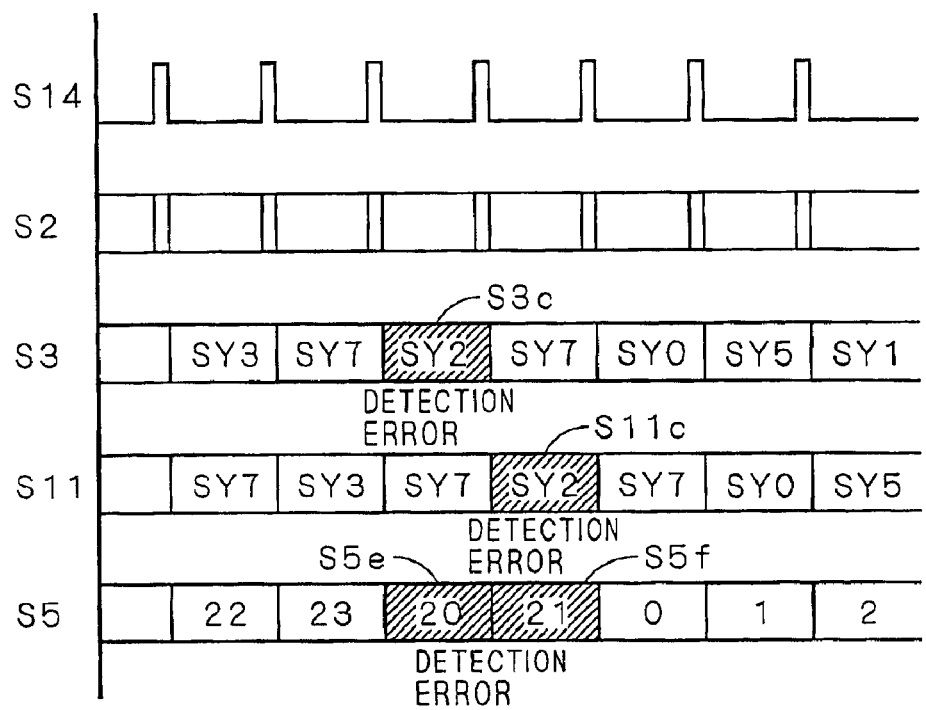

FIGS. 2 to 4 show examples in which the sync number encoding portion 6 cannot correctly encode the sync number. In the example shown in FIG. 2, a lack LK occurs in the sync signal and the sync signal type detecting/encoding portion 4 is unable to detect the sync signal type SY4 as shown in the frame S3a, and the sync number encoding portion 6 cannot specify the frame number as shown in the frames S5a and S5b. In the example shown in FIG. 3, the sync signal type detecting/encoding portion 4 erroneously detects SY5 in place of SY4 as shown in the frame S3b and the sync number encoding portion 6 cannot specify the frame number as shown in the frames S5c and S5d. Further, in FIG. 4, the sync signal type detecting/encoding portion 4 erroneously detects SY2 in place of SY4 as shown in the frame S3c and the sync number encoding portion 6 outputs wrong frame numbers 20 and 21 as shown in the frames S5e and S5f.

In the cases of FIGS. 2 and 3, as in the conventional frame number detecting device shown in FIG. 12, the presence of the first frame counter 7, comparator portion 8, state detecting counter 9 and gate circuits 10a and 11 enables output of correct frame numbers.

That is to say, the first frame counter 7 counts up its count number in response to the enable signal S16 and outputs the value as the signal S7 (the count number returns to 0 when it has reached 25). However, when a given condition is satisfied and the signal S6 inputted to the terminal L becomes High, it loads the signal S5 from the terminal IN and changes the value of its count number to the output value provided from the sync number encoding portion 6.

Figure 5:
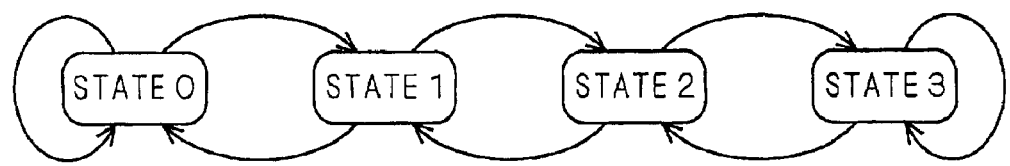
FIG. 5 is a diagram showing the transition of states of the state detecting counter 9 of the frame number detecting device of the first preferred embodiment.

The comparator portion 8 compares the output signal S5 from the sync number encoding portion 6 and the output signal S7 from the frame counter 7 to see whether they agree with each other. The result of comparison is outputted as the signal S8 to the state detecting counter 9 constructed as a 2-bit up/down counter (2-bit means that the state variable can take values 0, 1, 2 and 3). When the two agree with each other, the signal S8 causes the value of the state variable of the state detecting counter 9 to go up, which is outputted as the signal S9. On the other hand, when they disagree, it causes the value of the state variable of the state detecting counter 9 to go down. FIG. 5 is a diagram showing the state transition of the state variable in the case of 2 bits.

The gate circuit 10a causes the signal S10 to go high when the value of the output signal S9 of the state detecting counter 9 is at its lowest level (a state in which the signal S5 and the signal S7 have continuously disagreed, which corresponds to the state 0 in FIG. 5). This signal S10 is inputted together with the signal S4 to the gate circuit 11 constructed as an AND gate. The output signal S6 of the gate circuit 11 goes High when the signals S10 and S4 are both High. This is the condition under which the first frame counter 7 loads the output signal S5 provided from the sync number encoding portion 6.

Figure 11:
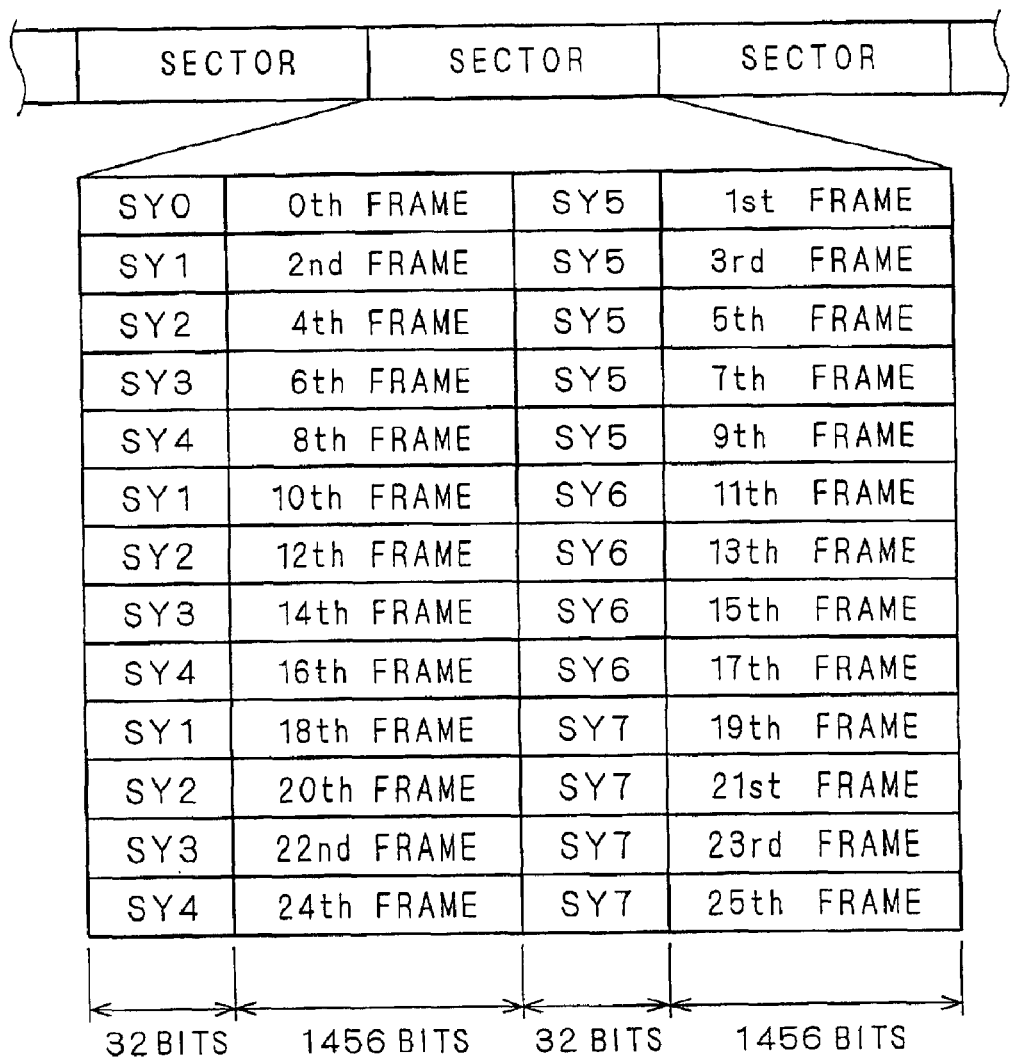
FIG. 11 is a diagram showing the format of an input signal supplied as an input to the frame number detecting device.

In the DVD signal recording format of FIG. 11, two sets of variations SY5→SY1 exist in one sector (first→second frame and ninth→tenth frame). In this case, they are undistinguishable, so that the sync number encoding portion 6 may cause the output signal S4 to go Low and the state detecting counter 9 may hold the value of the state variable.

For the timing of enabling the counting up in the first frame counter 7 and the timing of enabling the loading of the signal S5, the timing adjusting portion 3 generates it by delaying the signal S15 for 1-bit period or longer, for example, so that these operations will not precede the encoding operation of the sync number encoding portion 6 and the operation of outputting the signal S4. For the timing of enabling the up/down of the state variable of the state detecting counter 9, the timing adjusting portion 3 generates it by delaying the signal S16 for 1-bit period or longer, for example, so that this operation will not precede the operation of counting up of the first frame counter 7 and the operation of loading the signal S5.

However, when the sync signal type has been erroneously detected as shown in FIG. 4 and that variation of sync signal types corresponds to an existing frame number, the first frame counter 7 provides wrong outputs. This problem cannot be solved by the first frame counter 7, comparator 8, state detecting counter 9 and gate circuits 10a and 11.

Accordingly the gate circuit 10b and the second frame counter 13 are further provided to perform the following operation.

First, the gate circuit 10b is a gate circuit which detects that the signal S9 indicating the value of the state variable is at a favorable level and then causes the signal S12 to go High. The "favorable level" means a state in which the signals S5 and S7 have agreed at least twice, which corresponds to the state 2 or the state 3 in FIG. 5, for example. However, the state 2 can be achieved when a mismatch occurred in the preceding frame and the state changed from the state 3 to state 2. Therefore it is desirable that the favorable level be the state 3.

While the example of FIG. 5 shows four kinds of state variables, state 0 to state 3, the condition in which the signal S5 and the signal S7 have agreed at least twice can be detected as the favorable level as long as the state variable can take at least three values.

The second frame counter 13 increments its count number in response to the enable signal S18 corresponding to the sync signal input and outputs the value as the signal S13, which is outputted as the frame number (the count number returns to 0 when it has reached 25). When the signal S9 has reached the favorable level and the signal S12 has become High, it loads the signal S7 from the terminal IN and changes the value of its count number to the output value provided from the first frame counter 7.

For the timing of the counting up of the count number of the second frame counter 13 and the timing of the enable signal S18 for loading the signal S7, the timing adjusting portion 3 generates it by delaying the signal S17 for 1-bit period or longer, for example, so that these operations will not precede the up/down operation of the state variable of the state detecting counter 9.

In this way, the presence of the gate circuit 10b and the second frame counter 13 realizes a frame number detecting device which is less apt to output a wrong frame number even when it has erroneously detected the sync signal type and the variation combination of the sync signal types corresponds to an existing frame number. This is now described referring to FIG. 6.

Figure 6:
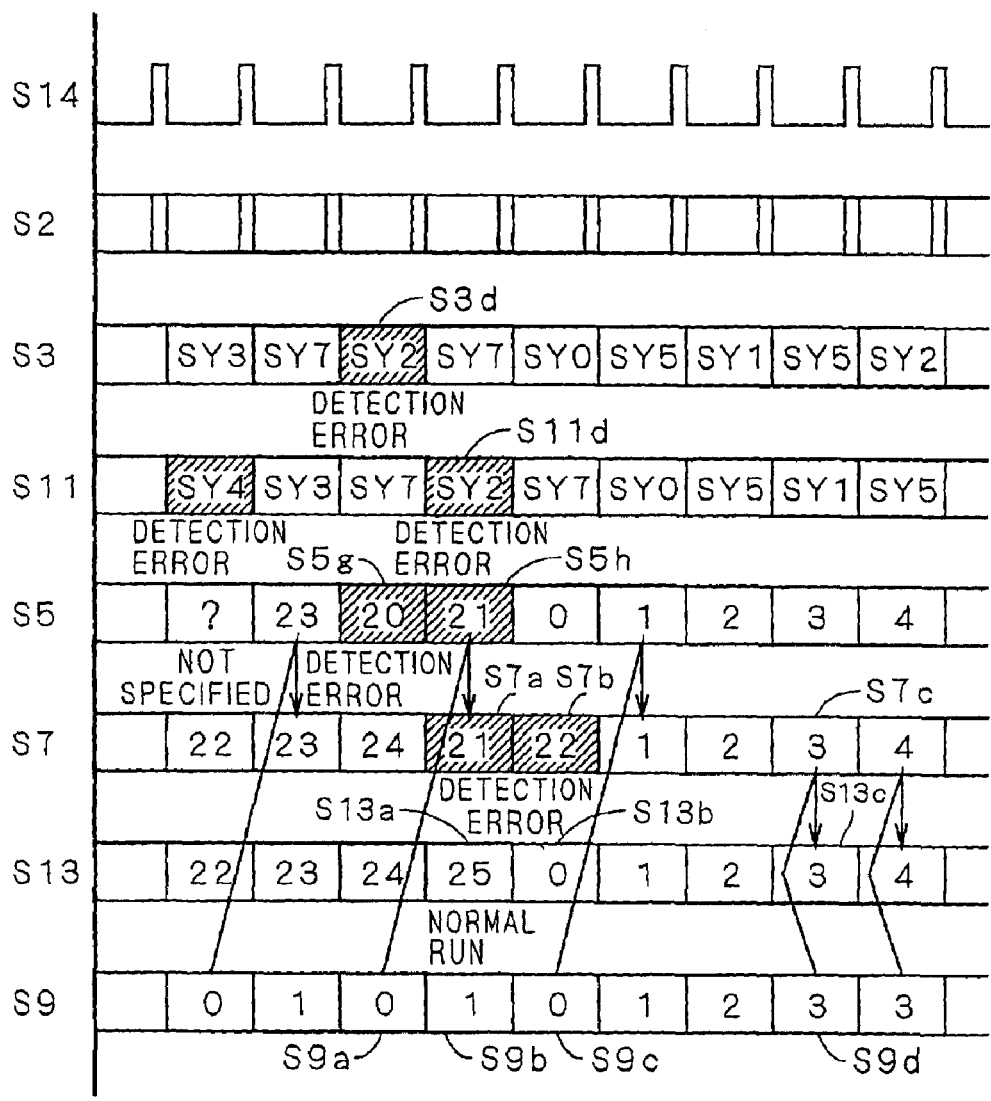
FIG. 6 is a timing chart showing operation of the frame number detecting device of the first preferred embodiment.

FIG. 6 shows a timing chart of the frame number detecting device of this preferred embodiment.

The frame number detecting device of this preferred embodiment can be regarded as comprising the conventional frame number detecting device of FIG. 12 and the gate circuit 10b and the second frame counter 13. Therefore the signals S3, S11, S5, S7 and S9 in FIG. 6 are equivalent respectively to the signals S2, S3, S5, S7 and S9 in FIG. 13.

That is to say, when the signal S3 has been detected as SY2 in the frame S3d where it should be SY4, then the signal S7 outputs the frame numbers 21 and 22 in the frames S7a and S7b where it should be 25 and 0.

In this preferred embodiment, however, the second frame counter 13 continues running by itself without changing the value of its count number, because the output signal S12 of the gate circuit 10b does not go active until the value of the state variable of the state detecting counter 9 attains the favorable level. Therefore, as shown in the frames S13a and S13b, the frame numbers can be correctly outputted as 25 and 0.

When the signal S5 and the signal S7 have continuously agreed and the value of the state variable of the signal S9 has attained the state 3 as shown in the frame S9d, the second frame counter 13 loads the signal S7 from the terminal IN to change the value of its count number to the output value provided from the first frame counter as shown in the frame S13c.

The timing adjusting portion 3 controls the transition timing of the signal S9 so that its change precedes the operation of the second frame counter 13. Therefore, unlike the first frame counter 7, the second frame counter 13 immediately changes the value of its count number within the frame in which the value of the state variable of the signal S9 attained the state 3. Thus, even when the value of the count number of the second frame counter 13 is disagreeing with the true frame number value, it can be immediately corrected.

The frame number detecting device of this preferred embodiment thus outputs the value of the count number of the second frame counter 13 as the frame number. Therefore, as compared with the device which outputs the value of the count number of the first frame counter 7 as the frame number, the frame number detecting device is less apt to output a wrong frame number even if the sync signal type detecting/encoding portion 4 has read a wrong sync signal type or when the frame number cannot be specified.

Further, the second frame counter 13 changes the value of its count number to the value of the count number of the first frame counter 7 when the state variable has reached a favorable level. Thus, the state in which the value of the frame number outputted from the sync number encoding portion 6 and the value of the count number of the first frame counter 7 have continuously agreed a plurality of times can be used as the condition for causing the second frame counter 13 to change the value of its count number. Therefore the second counter is less apt to output a wrong frame number.

<Second Preferred Embodiment>

This preferred embodiment shows a variation of the frame number detecting device of the first preferred embodiment.

Figure 7:
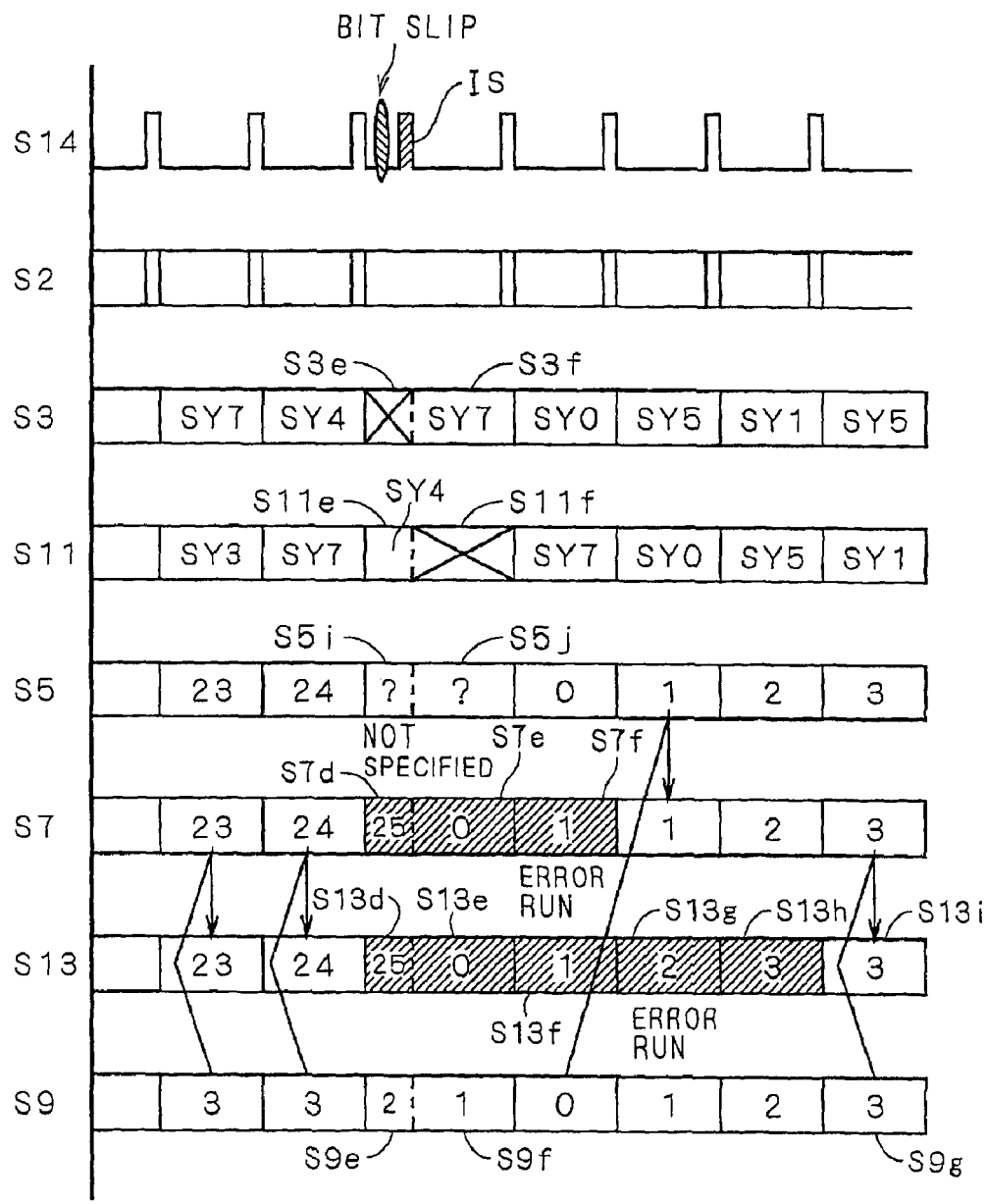
FIG. 7 is a diagram showing an example in which the frame number detecting device of the first preferred embodiment may fail to correctly output the frame number.

FIG. 7 is a timing chart showing an example in which even the frame number detecting device of the first preferred embodiment cannot correctly detect the frame number. In the example of FIG. 7, a bit slip occurred in the digital input signal and as a result the sync signal detecting/securing portion 2 generated an insert sync signal IS to secure the sync signal, and the insert sync signal IS and the actually detected sync signal were both provided as outputs.

In this case, the signal S14 exhibits a frequency higher than the normal sync signal period, thus apparently providing a larger number of data pieces. Thus, as shown in FIG. 7, the signal S14 is outputted twice within the single frame in which the insert sync signal IS is inserted. The timing signals S15 to S18 generated from the timing adjusting portion 3 are also outputted twice within the single frame period, so that the first frame counter 7 and the second frame counter 13 may provide wrong outputs when incrementing their count numbers.

That is to say, as shown in FIG. 7, when a bit slip occurs in the digital input signal, the frames S3e and S3f, and S11e and S11f are mixed within one frame and then the sync number encoding portion 6 may be unable to specify the frame number as shown in the frames S5i and S5j. In this case, the first frame counter 7 and the second frame counter 13 continue erroneously running by themselves for certain periods as shown in the frames S7d to S7f, and S13d to S13h.

The sync signal detecting/securing portion 2 usually applies window processing to the detected sync signal to avoid detection error, and it thus takes a measure against several-byte bit slips. Therefore the frame number detecting device of the first preferred embodiment of the invention correctly operates in the presence of small bit slips.

However, the size of the bit slip depends on the size of defects on the disk, the performance of the servo controlling movement of the disk, the performance of PLL (Phase-Locked Loop) circuit for synchronizing clock and data, the rotating speed of the disk, etc. Hence, in the presence of a large bit slip, the sync signal detecting/securing portion 2 may insert the insert sync signal IS where it is not wanted, as shown above. It is therefore necessary to remove such an unwanted insert sync signal IS.

Accordingly, in order to remove the unwanted insert sync signal IS, this preferred embodiment applies mask processing to the output signal S14 of the sync signal detecting/securing portion 2 so as to block pulse output for a certain period after one pulse has been detected.

FIG. 8 is a diagram showing a frame number detecting device according to the second preferred embodiment of the present invention. FIG. 8 shows components having the same functions as those of the frame number detecting device of the first preferred embodiment at the same reference characters. Therefore the reference characters 1 to 11 and 13 denote the same components as those of the first preferred embodiment and they are not described here again.

The reference character 12 denotes a masking portion for masking the output signal S14 of the sync signal detecting/securing portion 2. The masking portion 12 applies masking processing to the signal S14 and generates a signal S19 which is outputted to the timing adjusting portion 3.

FIG. 9 shows the structure of the masking portion 12. As shown in FIG. 9, the masking portion 12 comprises an edge detecting portion 12a, a counter 12b and an AND gate 12c.

The input signal S14 is first supplied as an input to the edge detecting portion 12a. The edge detecting portion 12a detects a rising edge of the pulse of the signal S14, for example, and then outputs a pulse signal S14a. The signal S14a is supplied as an input to the counter 12b. Receiving the input signal S14a, the counter 12b outputs a pulse signal S14b having a larger pulse width than the signal S14. After this, it does not output the signal S14b even if it is supplied with the input signal S14a until certain times of clock clk have been inputted.

The signal S14 and the signal S14b are then inputted to the AND gate 12c and the AND gate 12c computes a logical AND of the two and outputs a pulse signal S19. The masking processing is performed in this way.

Figure 10:
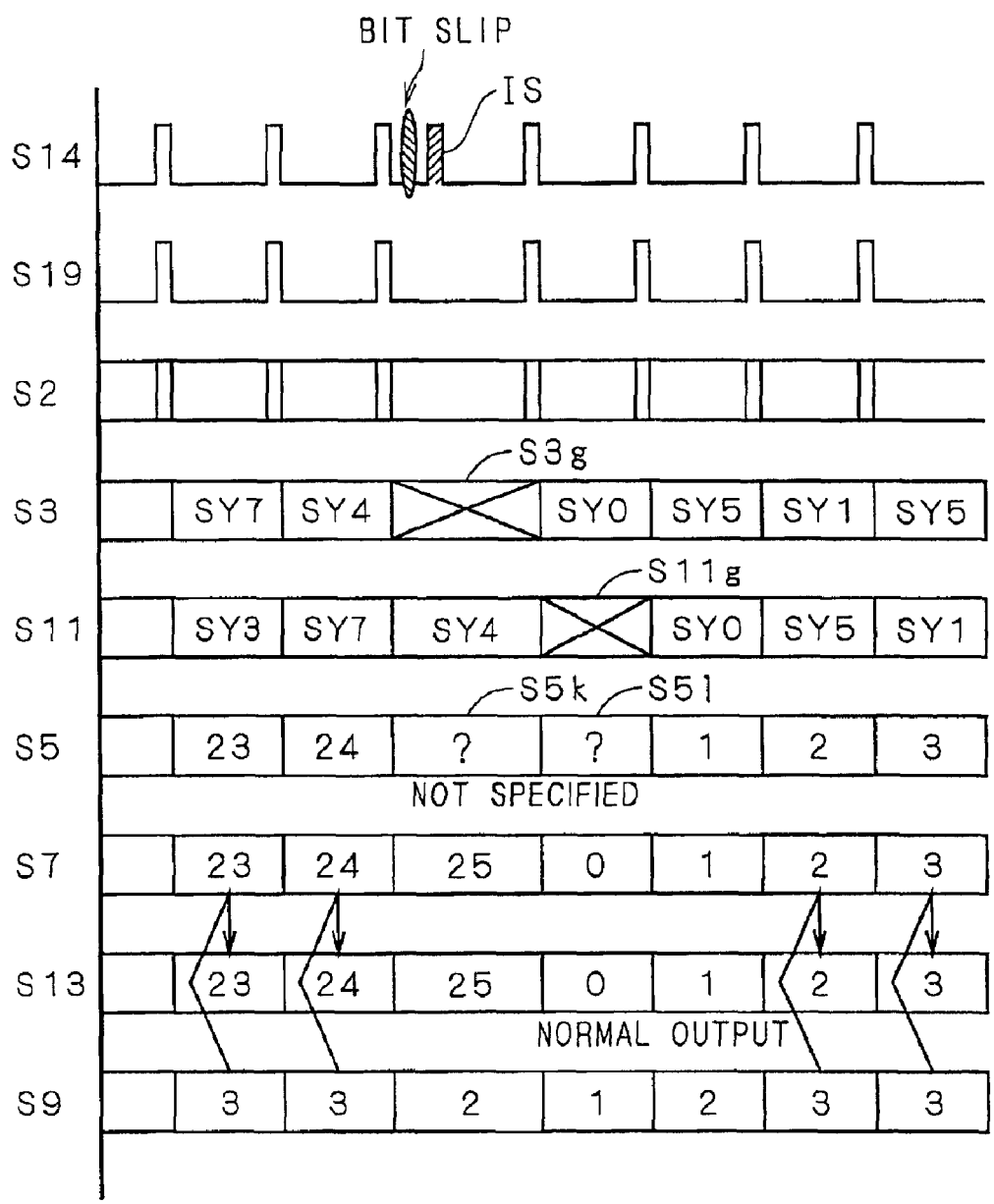
FIG. 10 is a timing chart showing operation of the frame number detecting device of the second preferred embodiment.

FIG. 10 shows a timing chart of the frame number detecting device of this preferred embodiment. As can be seen from FIG. 10, the unwanted insert sync signal IS is removed from the output signal S19 from the masking portion 12, so that many frames are not mixed in the frames S3g and S5k. This prevents the first frame counter 7 and the second frame counter 13 from providing wrong outputs when incrementing their count numbers.

According to the frame number detecting device of this preferred embodiment, after the sync signal detecting/securing portion 2 has outputted one pulse as the signal S14, the masking portion 12 blocks the output of pulse for a given period. It is therefore possible, even if a bit slip etc. occurs in the sync signal, to prevent the latch circuits 5a and 5b, sync number encoding portion 6, first and second frame counters 7 and 13 and state detecting counter 9 from operating a plurality of times within one frame data reading period. Therefore the second frame counter 13 is less apt to output wrong frame numbers.

<Another Variation>

In the above-described frame number detecting devices of the first and second preferred embodiments, the sync signal type detecting/encoding portion 4 detects all sync signal types SY0 to SY7. However, for example, it may be constructed to detect only SY0 to SY4 and SY7 to detect only the 19th to 0th frames. That is to say, the sync signal types which the sync signal type detecting/encoding portion 4 detects may be limited to sync signal types detected in given positions in a sector so as to detect the frame numbers by using part of the sync signal type combinations. Then the sync signal type detecting/encoding portion 4 can be constructed on a reduced circuit scale, which leads to higher operating speed.

While the invention has been described in detail, the foregoing description is in all aspects illustrative and not restrictive. It is understood that numerous other modifications and variations can be devised without departing from the scope of the invention.

What is claimed is:

1. A frame number detecting device, comprising:
   frame number detecting means receiving an input signal comprising a sector containing data of a plurality of frames, each said frame comprising frame number information recorded as a sync signal used to specify the number of said frame in said sector, said frame number detecting means detecting said numbers of said frames by using said sync signal of said input signal;
   first and second counters which increment their count numbers in accordance with input of said sync signal, wherein when said count numbers have reached a given value, said first and second counters return said count numbers to zero and then increment said count numbers again in accordance with the input of said sync signal;
   comparing means for comparing the value of said number of said frame read by said frame number detecting means and the value of said count number of said first counter to see whether the values agree with each other; and
   state detecting means which causes a state variable to vary on the basis of the result of comparison made by said comparing means, wherein when said state variable satisfies a given condition, said state detecting means causes said first counter to change the value of said count number to the value of said number of said frame read by said frame number detecting means without incrementing said count number, and when said state variable satisfies another given condition, said state detecting means causes said second counter to change the value of said count number to the value of said count number of said first counter without incrementing said count number, and wherein said frame number detecting device outputs the value of said count number of said second counter as said number of said frame.

2. The frame number detecting device according to claim 1, wherein said sync signal comprises a plurality of types, and said frame number detecting means detects said numbers of said frames by using part of combinations of said types of said sync signal in successive two or more of said frames.

3. The frame number detecting device according to claim 2, wherein said frame number detecting means comprises, sync signal type detecting/encoding means for specifying said type of said sync signal and outputting said type in an encoded form, a latch circuit for latching an output from said sync signal type detecting/encoding means, and sync number encoding means for detecting a combination of variation of said types of said sync signal of successive two or more of said frames by using an output from said sync signal type detecting/encoding means or/and an output from said latch circuit, specifying said number of said frame by using said part of said combinations, and encoding said number of said frame.

4. The frame number detecting device according to claim 3, wherein said frame number detecting means further comprises converting means for converting said input signal into a plurality of pieces of parallel data having the same contents, and said sync signal type detecting/encoding means comprises, sync signal type detecting means comprising a plurality of detectors, said plurality of detectors respectively receiving said pieces of said parallel data and specifying said type of said sync signal in said parallel data, and sync signal type encoding means for encoding an output from said sync signal type detecting means and outputting the encoded type.

5. The frame number detecting device according to claim 3, wherein said frame number detecting means comprises a plurality of said latch circuits.

6. The frame number detecting device according to claim 1, wherein said state detecting means comprises, an up/down counter receiving said result of comparison made by said comparing means, said up/down counter increasing/decreasing its count number in accordance with said result of comparison and outputting said count number as said state variable, a first gate circuit composed of a combination of a plurality of gate circuits, said first gate circuit causing its output signal to go active when said state variable has reached a given value, a second gate circuit composed of a combination of a plurality of gate circuits, wherein when said state variable has reached another given value, said second gate circuit causes its output signal to go active and outputs said output signal to said second counter, thereby causing said second counter to change the value of said count number to the value of said count number of said first counter without incrementing said count number, and a third gate circuit, wherein when said frame number detecting means has detected said number of said frame and the output signal of said first gate circuit has become active, said third gate circuit causes its output signal to go active and outputs said output signal to said first counter, thereby causing said first counter to change the value of said count number to the value of said number of said frame read by said frame number detecting means without incrementing said count number.

7. The frame number detecting device according to claim 1, wherein said state variable can take at least three values, and when said result of comparison made by said comparing means indicates a mismatch, said state detecting means causes the value of said state variable to vary in an increasing or decreasing direction, and when said result of comparison made by said comparing means indicates a match, said state detecting means causes the value of said state variable to vary in a direction opposite to the direction adopted in the case of said mismatch, and wherein said given condition is a condition in which said frame number detecting means was able to detect said number of said frame and said state variable has reached a given value, and said another given condition is a condition in which said state variable has reached another given value.

8. The frame number detecting device according to claim 1, further comprising timing adjusting means for adjusting timing of operations of said frame number detecting means, said first and second counters and said state detecting means by using said sync signal.

9. The frame number detecting device according to claim 8, further comprising, sync signal detecting/securing means for detecting said sync signal and outputting a pulse corresponding to said sync signal, wherein when said sync signal is lacking, said sync signal detecting/securing means inserts an interpolating sync signal pulse, and masking means for blocking the output of said pulse for a given period after said sync signal detecting/securing means has outputted one pulse.

10. The frame number detecting device according to claim 9, wherein said masking means comprises, edge detecting means receiving said pulse outputted from said sync signal detecting/securing means, for detecting an edge of said pulse, a counter which, when receiving an output of said edge detecting means, outputs another pulse having a larger pulse width than said pulse and then ceases outputting said another pulse until certain times of clock have been inputted even if supplied with said output of said edge detecting means, and an AND gate receiving said pulse and said another pulse as its inputs.

* * * * *